US006477168B1

(12) United States Patent
Delp et al.

(10) Patent No.: US 6,477,168 B1
(45) Date of Patent: Nov. 5, 2002

(54) CELL/FRAME SCHEDULING METHOD AND COMMUNICATIONS CELL/FRAME SCHEDULER

(75) Inventors: Gary Scott Delp; Philip Lynn Leichty, both of Rochester; Kevin Gerard Plotz, Byron, all of MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/244,548

(22) Filed: Feb. 3, 1999

(51) Int. Cl.[7] .............................................. H04L 12/56

(52) U.S. Cl. ...................................... 370/395.4; 370/412

(58) Field of Search ................................. 370/229, 230, 370/395.1, 395.4, 395.41, 395.42, 395.43, 395.5, 395.7, 412–418

(56) References Cited

U.S. PATENT DOCUMENTS

| | | | |
|---|---|---|---|
| 5,533,009 A | * | 7/1996 | Chen |
| 5,533,020 A | * | 7/1996 | Bryn et al. |
| 5,533,021 A | * | 7/1996 | Branstad et al. |
| 5,537,408 A | * | 7/1996 | Branstad et al. |
| 5,548,587 A | * | 8/1996 | Bailey et al. |
| 5,579,312 A | * | 11/1996 | Regache |
| 5,629,928 A | * | 5/1997 | Calvignac et al. |
| 5,652,749 A | * | 7/1997 | Davenport et al. |
| 5,694,548 A | * | 12/1997 | Baugher et al. |
| 5,844,890 A | * | 12/1998 | Delp et al. |

OTHER PUBLICATIONS

"Pos–Phy™ Saturn Compatible Packet Over Sonet Interface Specification For Physical Layer Devices (Level 2)" by PMC–Sierra, Inc. Saturn Group, Issue 2, Jan., 1998.

RFC 2171, "Multiple Access Protocol Over Sonet/SDH, Version 1", by K. Murakami and M. Maruyama, Jun., 1997.

Patent Application (RO998–180), copending Serial No. __, filed on the same date as the present application, entitled: Communications Adapter for Implementing Communications in a Network and Providing Multiple Modes of Communications, by Branstad et al.

Patent Application (RO998–258), copending Serial No.__, filed on the same date as the present application, entitled: Communications Methods and Gigabit Ethernet Communications Adapter Providing Quality of Service and Receiver Connection Speed Differentiation, by Branstad et al.

Patent Application (RO998–155), copending Serial No. 09/166,004, filed on Oct. 2, 1998 and entitled: Memory Controller With Programming Delay Counter For Tuning Performance Based On Timing Parameter Of Controlled Memory Storage Device, by Gary P. McClannathan.

(List continued on next page.)

*Primary Examiner*—David Vincent
(74) *Attorney, Agent, or Firm*—Joan Pennington

(57) ABSTRACT

A method and apparatus are provided for scheduling the transmission of cells and frames in a communications network. The transmission of cells and frames are scheduled utilizing a selected scheduling algorithm. The cell/frame scheduling algorithm includes the step of identifying a frame or cell transmission type. Responsive to the identified frame or cell transmission type, a frame multiplier value is identified. A target transmission time is calculated for the frame or cell transmission type utilizing the identified frame multiplier value. A method and apparatus optionally are provided for scheduling the transmission of packet pairs.

17 Claims, 14 Drawing Sheets

OTHER PUBLICATIONS

Patent Application (RO998–185), Serial No. 09/223,056, filed Dec. 30, 1998 entitled: Method and Apparatus for User Programmable Packet to Connection Translation, by Albert A. Slane.

Patent Application (RO996–150), "An Earliest Deadline First Communications Cell Scheduler and Scheduling Method for Transmitting Earliest Deadline Cells First", by Delp et al., Ser. No. 08/823,155, filed Mar. 25, 1997.*

Patent Application (RO997–057), "Method and Apparatus for Resource Allocation with Guarantees", By Delp et al., Ser. No. 08/845,967, filed Apr. 30, 1997.*

"A Self–Clocked Fair Queueing Scheme for BroadBand Applications" by S. Jamaloddin Golestani, Proceeding IEEE Infocom v2, 1994, IEEE, Piscataway, N.J., 94CH3401–7. pp. 636–646.*

* cited by examiner

FIG. 2B

SCHEDULING RATE PARAMETERS 220

- PEAK TRANSMISSION RATE 222
- SUSTAINABLE TRANSMISSION RATE 224
- PEAK BURST LENGTH 226
- CBR/VBR TRAFFIC TYPE 228
- MAX DELAY 230
- FRAME/CELL 232

FIG. 2A

LOGICAL CHANNEL DESCRIPTOR (LCD) 206

- NEXT LCD POINTER 209
- HEAD OF CELL/FRAME QUEUE 210
- TAIL OF CELL/FRAME QUEUE 212
- SCHEDULING PARAMETERS 214
- SCHEDULING STATE 216
- TIMING WHEEL SELECTOR 218

FIG. 2C

SCHEDULING STATE 240

- TIME STAMP 241
- TIME MULTIPLIER 242

FIG. 9

THREE TIER CELL SCHEDULER 102

LEAKY BUCKET TIMING WHEEL
HIGHEST PRIORITY
902

EARLIEST DEADLINE FIRST
TIMING WHEEL
MIDDLE PRIORITY
904

BEST EFFORT
TIMING WHEEL
LOWEST PRIORITY
906

| PACKET PAIR L1, L2 | LINK SPEED | TIME |
|---|---|---|
| L1 SIZE | | |
| 1500 BYTES | 1G | 12 MICROSEC. |
| 1500 BYTES | 100 M | 120 MICROSEC. |
| 1500 BYTES | 10 MB | 1.2 MICROSEC. |
| 1500 BYTES | 56K | 2/10 MILLISEC. |
| L2 SIZE | | |
| 40 BYTES | 1G | 320 NANOSEC. |
| 40 BYTES | 100 M | 3.2 MICROSEC. |
| 40 BYTES | 10 MB | 32 MICROSEC. |
| 40 BYTES | 56K | 5.12 MILLISEC. |
| ACK RANGE | 1G ⟶ 1G | ~ 12-13 MICROSEC. |
| | 1G ⟶ 100 M | ~ 120-124 MICROSEC. |
| | 1G ⟶ 10 M | ~ 1.2 MILLISEC. |
| | 1G ⟶ 56 K | ~ 0.2 SEC. |

CELL/FRAME SCHEDULING METHOD AND COMMUNICATIONS CELL/FRAME SCHEDULER

FIELD OF THE INVENTION

The present invention relates generally to the data processing field, and more particularly, relates to a method and communications apparatus for scheduling communications including both cells and frames over a data communications network.

DESCRIPTION OF THE RELATED ART

An Asynchronous Transfer Mode (ATM) network described in "ATM: Theory and Application" by David E. McDysan and Darren L. Spohn, McGraw-Hill, 1994 is an internationally agreed upon technique for transmission, multiplexing and switching in a broadband network. ATM networks are designed to support the integration of high quality voice, video, and high speed data traffic. ATM networks use fixed size cells as a unit of transmission. As technology increases, it is expected that the Asynchronous Transfer Mode (ATM) technology and ATM networks will supply much of the need for high speed network interconnection.

In the face of emerging proprietary optical transmission protocols, SONET (Synchronous Optical Network) was provided as an open standard for synchronous data transmission on optical media. The standard was approved in 1988 by the predecessor to today's International Telecommunication Union, and in 1989 by the American National Standards Institute. SONET is widely deployed in the US. Using time division multiplexing, SONET works by dividing a fiber transmission path into multiple logical channels called tributaries. A tributary's basic unit of transmission is an STS-1 (synchronous transport signal, level 1) or OC-1 (optical carrier, level 1) signal. STS describes a transmission's signals while in an electrical state, and OC describes the same traffic after being converted into optical signals. STS-1 and OC-1 both operate at 51.84 Mbps. OC2 is twice as fast, OC-3 is three times as fast, and so on. SONET is based on direct synchronous multiplexing, where separate signals are multiplexed directly into higher speed signals. For example, an OC-12 circuit might carry traffic from four OC-3 links. SONET line rates are currently operating up to OC-192 (9.953 Gbps). This is considerably faster than ATM's maximum current rate of 622 Mbps or Ethernet's current rate of 1 Gbps.

Ethernet is the original and still common name for the communications technique that has been standardized by the IEEE as some of the 802.x standards. 802.3 is the general Ethernet standard and 802.x are the link layer standards covering a variety of speeds.

A Packet over SONET communications interface is described in "POS-PHY™ SATURN COMPATIBLE PACKET OVER SONET INTERFACE SPECIFICATION FOR PHYSICAL LAYER DEVICES (Level 2)" by PMC-Sierra, Inc. Saturn Group, Issue 2, January, 1998. Also, RFC 2171 documents a multiple access protocol for transmission of network-protocol datagrams, encapsulated in High-Level Data Link Control (HDLC) over SONET/SDH (Synchronous Digital Hierarchy).

Asynchronous Transfer Mode or ATM is a communication technology whose use is becoming more widespread in some areas while receiving competitive competition from Gigabit Ethernet and Packet Over SONET (POS) in other areas. The system designer and IS administrator is faced with the daunting task of choosing one technology over another, and allocating scarce development resource to optimize in their individual system one or another of these technologies. If there were a way to isolate the differences of these various technologies from the preparation for the use of the technology, the benefits would be widespread.

A related patent application is copending Ser. No. 09/243858, filed on the same date as the present application, entitled: COMMUNICATIONS ADAPTER FOR IMPLEMENTING COMMUNICATIONS IN A NETWORK AND PROVIDING MULTIPLE MODES OF COMMUNICATIONS, by Branstad et al., and assigned to the present assignee. The subject matter of the above identified patent application is incorporated herein by reference.

A related patent application is copending Ser. No. 09/243956, filed on the same date as the present application, entitled: COMMUNICATIONS METHODS AND GIGABIT ETHERNET COMMUNICATIONS ADAPTER PROVIDING QUALITY OF SERVICE AND RECEIVER CONNECTION SPEED DIFFERENTIATION, by Branstad et al., and assigned to the present assignee. The subject matter of the above identified patent application is incorporated herein by reference.

To this end, a need exists to design and construct communication adapters and networking equipment that provide a simple, efficient, and versatile interface to a system and at the same time be capable of communicating in a variety of modes. A need exists for an improved method and apparatus for scheduling the transmission of both cells and frames in a communications network.

SUMMARY OF THE INVENTION

Important objects of the present invention are to provide an improved method and apparatus for scheduling the transmission of cells and frames in a communications network; and to provide such method and apparatus that overcome disadvantages of prior art arrangements.

In brief, a method and apparatus are provided for scheduling the transmission of cells and frames in a communications network. The transmission of cells and frames are scheduled utilizing a selected scheduling algorithm. The cell/frame scheduling algorithm includes the step of identifying a frame or cell transmission type. Responsive to the identified frame or cell transmission type, a frame multiplier value is identified. A target transmission time is calculated for the frame or cell transmission type utilizing the identified frame multiplier value.

In accordance with features of the invention, cells are fixed sized and frames are variable sized. Frames presented for transmission on a cell based interface are segmented into cells and are transmitted, possibly using multiple transmission opportunities. A frame presented for transmission on a frame based interface is transmitted using a single transmission opportunity.

In accordance with features of the invention, a method and apparatus optionally are provided for scheduling the transmission of packet pairs.

BRIEF DESCRIPTION OF THE DRAWINGS

The present invention together with the above and other objects and advantages may best be understood from the following detailed description of the preferred embodiments of the invention illustrated in the drawings, wherein:

FIG. 2A is a chart illustrating a logical channel descriptor (LCD) for a data stream used by the cell/frame scheduler of the preferred embodiment of FIG. 1;

FIG. 2B is a chart illustrating scheduling rate parameters for a constant bit rate, variable bit rate or a leaky bucket rate;

FIG. 2C is a chart illustrating scheduling state used by the cell/frame scheduler of the preferred embodiment of FIG. 1;

FIG. 9 is a block diagram representation illustrating an alternative three tier timing wheel cell/frame scheduler of the preferred embodiment of FIG.

DETAILED DESCRIPTION OF THE PREFERRED EMBODIMENTS

Figure 1:
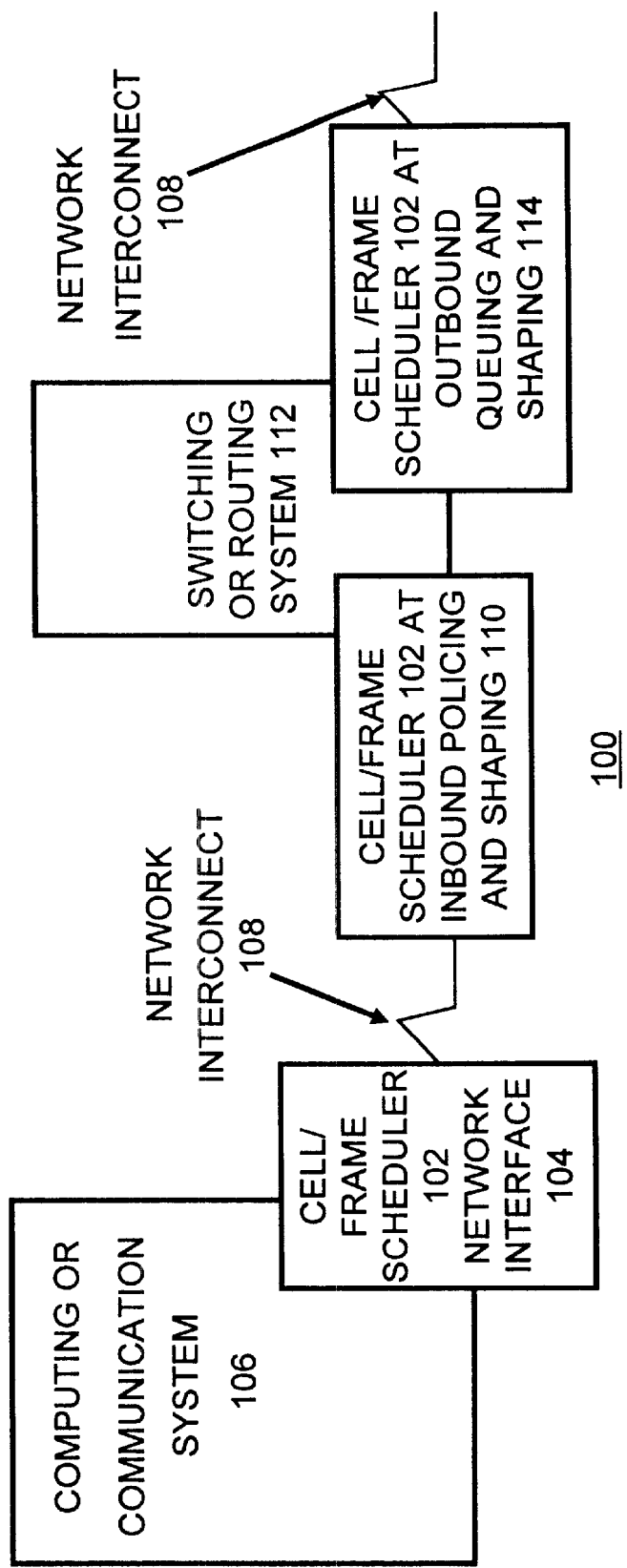
FIG. 1 is a block diagram representation illustrating a communications network system including cell/frame schedulers of the preferred embodiment.

Having reference now to the drawings in FIG. 1, there is shown a communications system 100 including at least one cell/frame scheduler 102 of the preferred embodiment. As shown in FIG. 1, cell/frame scheduler 102 advantageously is used at each network interconnect 108 at the ingress to or outbound from the network 100. Cell/frame scheduler 102 advantageously is included with a network interface 104 of a computing or communication system 106, at an inbound policing and shaping input 110 of a network internal switching or routing system 112, and/or at an outbound queuing and shaping output 114 of the switch or router 112.

In accordance with features of the preferred embodiment, the cell/frame scheduler 102 is capable of scheduling communications in the cell mode of ATM, the packet over SONET mode of POS, and the frame mode of Gigabit Ethernet, for example, at rates of 10 Gbps and 100 Gbps. As used in the following description and claims, it should be understood that buffers includes FIFO buffered sequences of cells, frames or streams or sequences of bytes without packet boundaries or ordered bit sequences.

The cell/frame scheduler 102 includes functional operations as a scheduler disclosed in U.S. Pat. No. 5,533,020, entitled ATM CELL SCHEDULER, issued July 2, 1996 to Byrn et al., and assigned to the present assignee. The subject matter of the above-identified patent is incorporated herein by reference.

The cell/frame scheduler 102 includes functional operations as a communications cell scheduler disclosed in U.S. Pat. No. 5,844,890, entitled COMMUNICATIONS CELL SCHEDULER AND SCHEDULING METHOD FOR PROVIDING PROPORTIONAL USE OF NETWORK BANDWIDTH, issued December 1, 1998 to Delp et al., and assigned to the present assignee. The subject matter of the above-identified patent is incorporated herein by reference.

A related patent application is copending Ser. No. 08/823, 155, filed on March 25, 1997, entitled: AN EARLIEST DEADLINE FIRST COMMUNICATIONS CELL SCHEDULER AND SCHEDULING METHOD FOR TRANSMITTING EARLIEST DEADLINE CELLS FIRST, by Gary S. Delp et al., and assigned to the present assignee. The subject matter of the above identified patent application is incorporated herein by reference.

Figure 2:
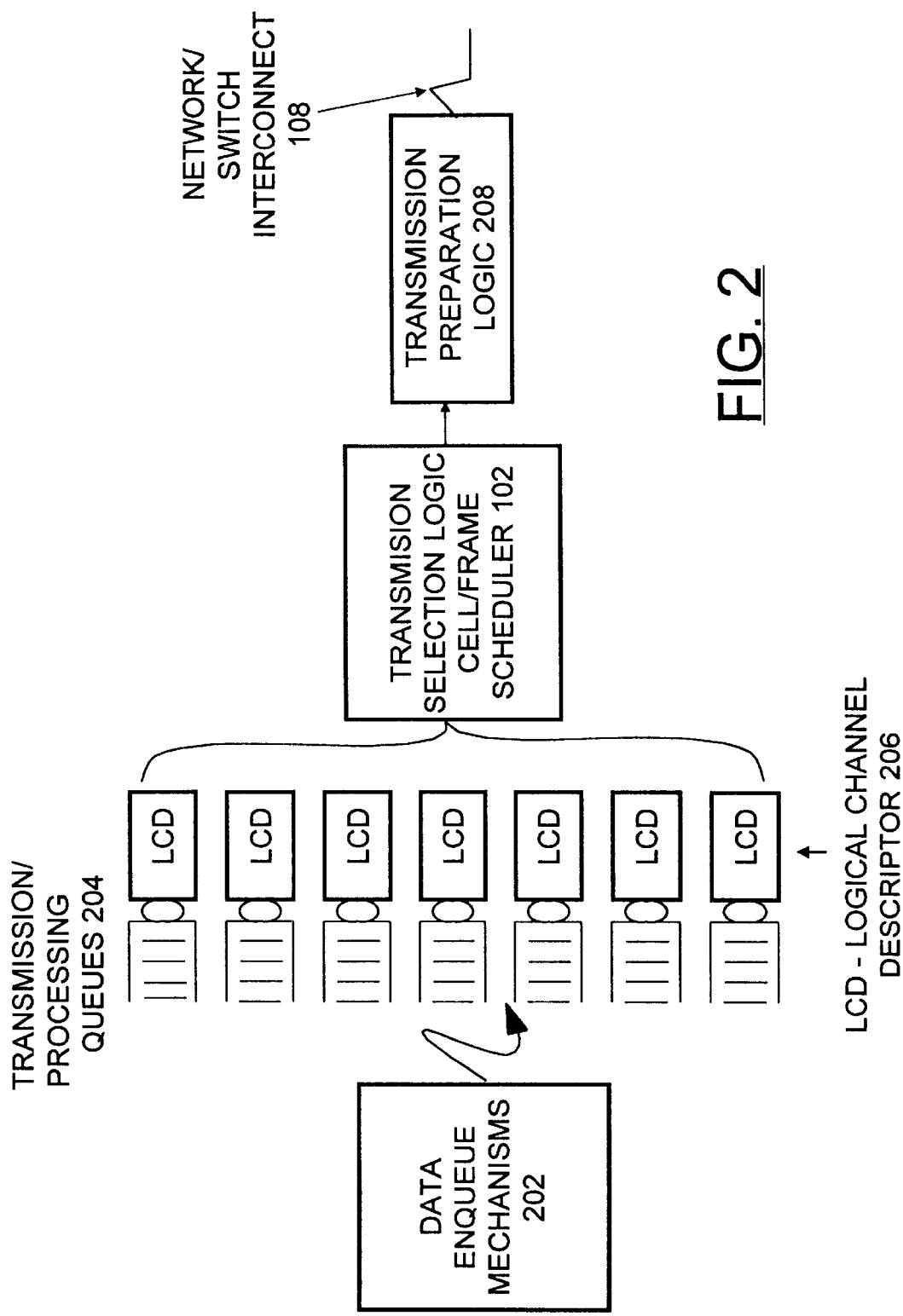
FIG. 2 is a block diagram representation illustrating the operation of the cell/frame scheduler of the preferred embodiment of FIG. 1.

Having reference to FIG. 2, the cell/frame scheduler 102 is fed by a data enqueue mechanism 202 providing transmission/processing queues 204 with each queue including a logical channel descriptor (LCD) 206 or other such type of logical connection or identified data flow control block. The data enqueue mechanism 202 may be receive logic from the network 100, a stored program processor, a hardware data encoding unit, e.g., a Video camera, or a combination of these mechanisms. Cell/frame scheduler 102 uses the set of logical channel descriptors LCDs 206 that hold the data for each scheduled data entity. This may include a queue of data descriptors and configuration information for the transmission preparation logic. The scheduling selection logic of cell/frame scheduler 102 selects a succession of LCDs and passes this selected succession to the transmission preparation logic 208. When transmitting frames or buffers onto a cell based transmission line, the transmission preparation logic 208 includes a segmenter. The segmenter of transmission preparation logic 208 takes the larger transport units and breaks them into cells. When the transmission unit is segmented, multiple scheduling opportunities may be required for the full transmission of a frame/buffer. In general, the transmission preparation logic 208 takes the LCD data structure selected by the scheduling selection logic 102 and prepares a transmission.

U.S. Pat. No. 5,652,749, entitled APPARATUS AND METHOD FOR SEGMENTATION AND TIME SYNCHRONIZATION OF THE TRANSMISSION OF A MULTIPLE PROGRAM MULTIMEDIA DATA STREAM, issued July 29, 1997 to Davenport et al., and assigned to the present assignee discloses a multimedia server including a cell scheduler receiving transport stream (TS) packets and providing ATM cells. The subject matter of the above-identified patent is incorporated herein by reference.

Referring to FIG. 2A, there is shown a chart illustrating the logical channel descriptor (LCD) 206 for a data stream used by cell scheduler 102. The LCD 206 is a data structure which describes a data stream cell queue. LCD 206 includes a next LCD pointer 209 for linking LCDs together at a timing wheel time slot. LCD 206 includes pointers to a chain of cells and/or packets to be transmitted including a head of cell/packet queue pointer 210 and a tail of cell/packet queue pointer 212. LCD 206 also includes scheduling information for the corresponding data stream shown as scheduling parameters 214, a scheduling state 216 and a timing wheel selector 218.

Referring to FIG. 2B, there is shown a chart listing multiple scheduling rate parameters 220 including a peak transmission rate 222, a sustainable transmission rate 224, a peak burst length 226, a constant bit rate/variable bit rate CBR/VBR traffic type 228, a max delay 230, and a frame/cell transmit 232. These scheduling rate parameters 220 are specified for a constant bit rate, variable bit rate or a leaky bucket rate connection. These rates 222 and 224 are converted into intervals in terms of a number of fast timing wheel slots and fractions. The burst length is maintained as the maximum difference between the connection time stamp and the current time.

Referring to FIG. 2C, there is shown a chart illustrating a scheduling state 240. The scheduling state 240 maintains a time stamp 241 for the connection, and a current frame multiplier 242.

Figure 3:
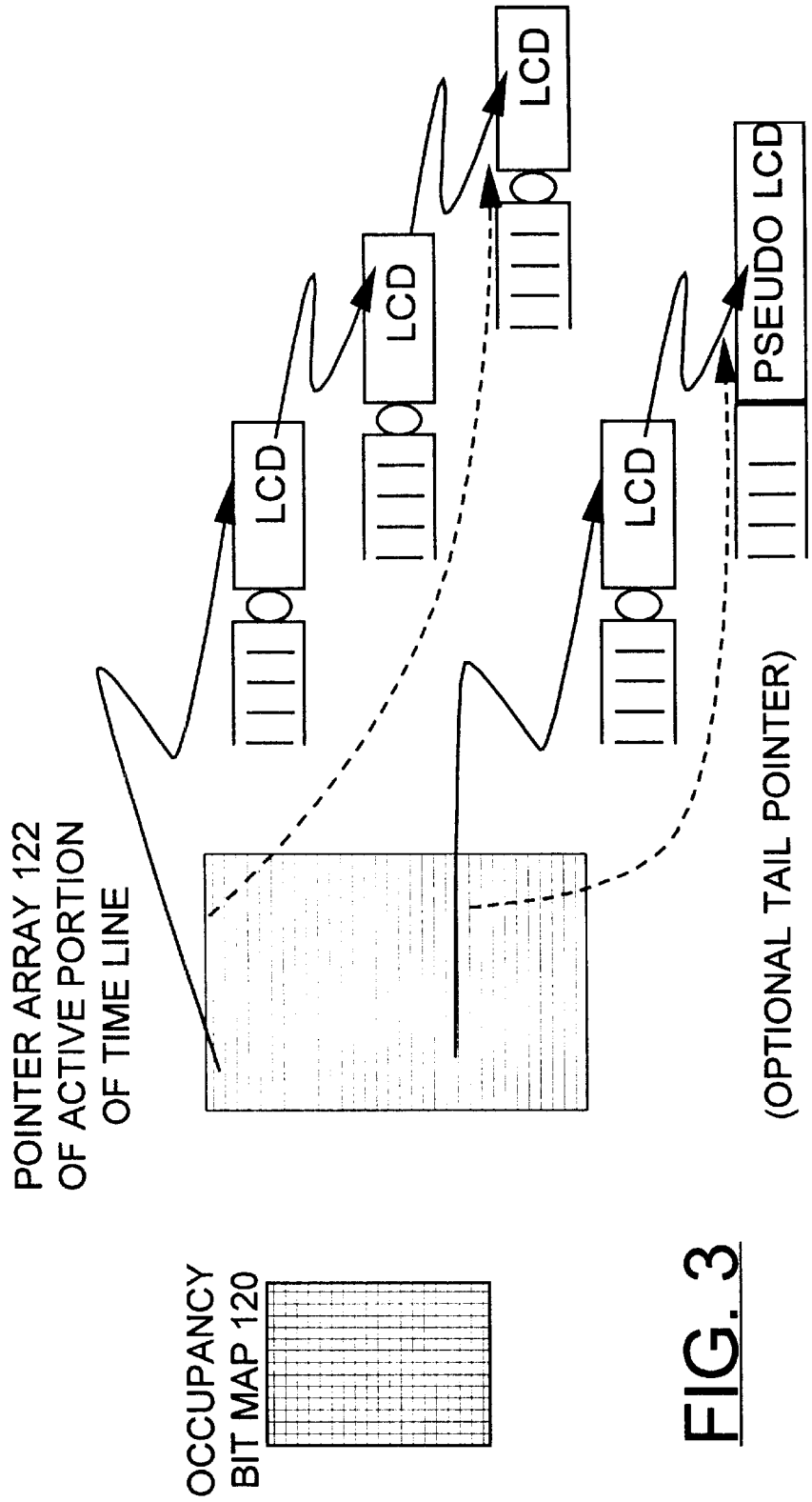
FIG. 3 is a schematic and block diagram representation illustrating data structures including a time wheel of the cell/frame scheduler of the preferred embodiment of FIG. 1.
Figure 4:
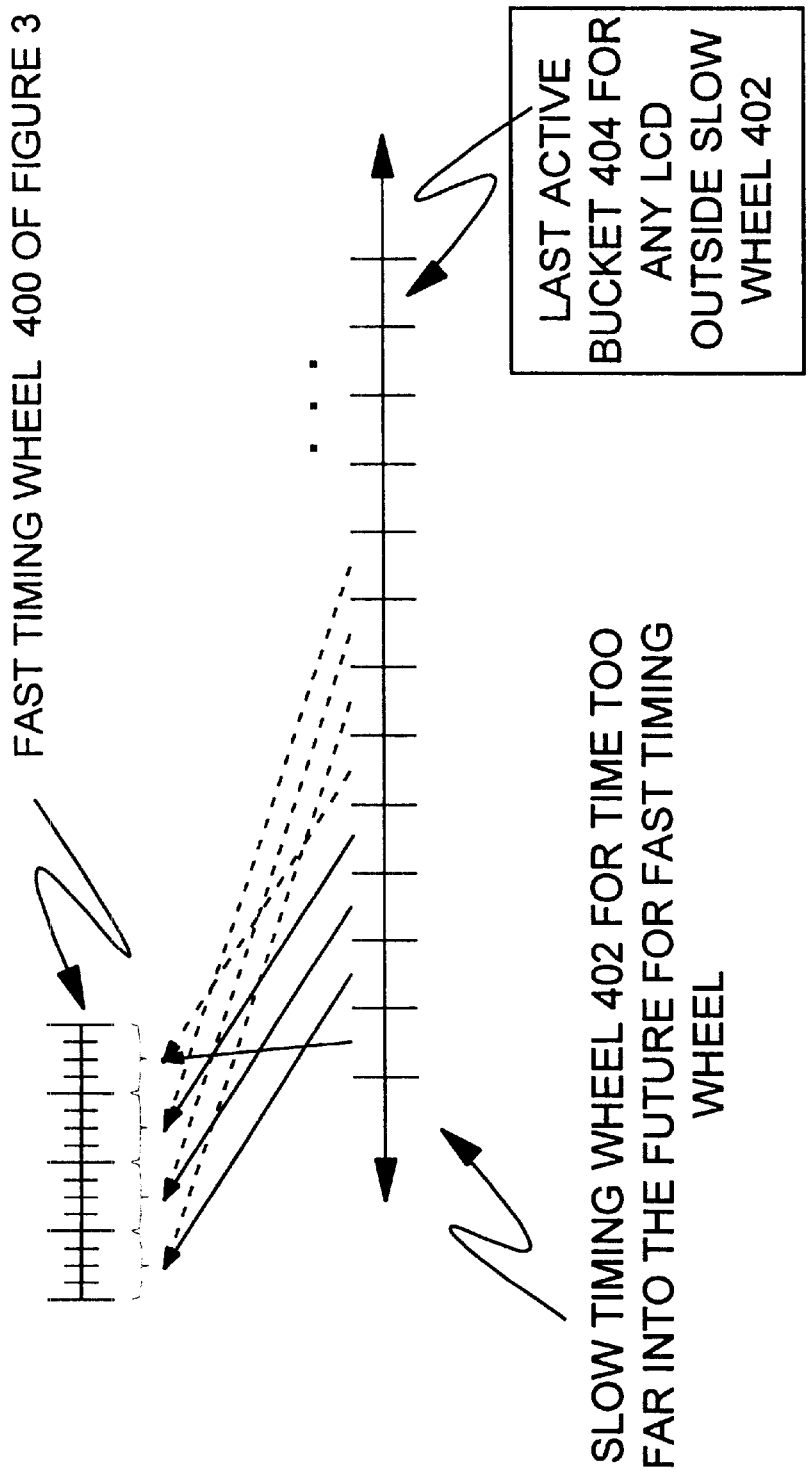
FIG. 4 is a schematic and block diagram representation illustrating fast and show time wheels and a last active bucket of the cell/frame scheduler of the preferred embodiment of FIG. 1.

Referring to FIG. 3, the cell/frame scheduler 102 is made up of data structures including at least one timing wheel, such as timing wheels 400, 402 illustrated in FIG. 4. As shown in FIG. 3, the data structures include a timing wheel comprising an array 122 of pointers to LCDs and an optional occupancy bit map 120 of the timing wheel, comprising a bit for each storage location in the timing wheel. Each bit indicates whether the timing wheel slot contains a valid pointer. This bit is used to control the need for reading memory locations and is used to support a fast scan forward. This bit array may be able to be read more than 1 bit at a time. Reading this bit array returns a frame of bits which can be evaluated as a group. Additionally, the LCD contains the next LCD pointer 209 that can be used to point to the next LCD stored in the same slot in the timing wheel. This pointer is used to create a chain of LCDs for each active time slot. Optionally the timing wheel can contain a set of pointers that point to the last entry in the chain of LCDs. This second pointer can be used for fast insertion to the end of the chain of LCDs. While not a required element, this second pointer is included in the preferred embodiment.

Having reference to FIG. 4, a fast timing wheel 400 and a slow timing wheel 402 optionally are used. Each slot in each timing wheel corresponds to a range of time, with the fast timing wheel 400 used for smaller ranges of time, and the slow timing wheel 402 used for larger ranges of time. FIG. 4 illustrates connections between these timing wheels 400 and 402, together with a last active bucket 404 that is used for any LCDs with target transmission time greater than currently represented by the slow timing wheel 402.

Cell/frame scheduler 102 keeps track of the current time of the system by a global variable, curr_slot which equals the current time in slots. For each LCD connection (i) the constants that are maintained include a mean interval in slots, mean_int(i); a product of the mean interval, and the burst size in slots, bmproduct(i); the minimum cell inter-transmission time in slots, peak_int(i); and the delay guarantee or deadline in slots for the connection (i), max_delay (i). Dynamic connection variables that are maintained include the state of the leaky bucket, state(i), which is the greater of state(i) and the sum of the mean_int(i) and {curr_slot - bmproduct(i)}; and the slot in the timing wheel where the cell from connection (i) is placed, qslot(i). The state of the leaky bucket, state(i) is further defined in the following. Note that bmproduct(i) acts as a limit to the temporal memory of the scheduling state. This is often referred to as a leaky bucket.

A basic scheduling algorithm of cell/frame scheduler 102 scans forward in the timing wheel 400 with a limited look ahead, L, from the current time curr_slot. If it finds a first connection, say connection (i) with an LCD enqueued on the timing wheel (TW) within that range, i.e., (qslot(i) - curr_slot) < L, then cell/frame scheduler 102: a) sends out this cell or frame; b) increments the curr_slot; and c) computes the next time that this LCD has to be enqueued on the timing wheel 400 or 402.

When the time wheel scheduler is configured for frame transmission, to calculate the next target transmission time, the "move forward" process on the time wheel moves a step multiplied by a frame multiplier corresponding to the frame length. This allows quality of service and mixing of various qualities of service over a single "frame" link, much in the manner that ATM provides for quality of service.

Figure 5:
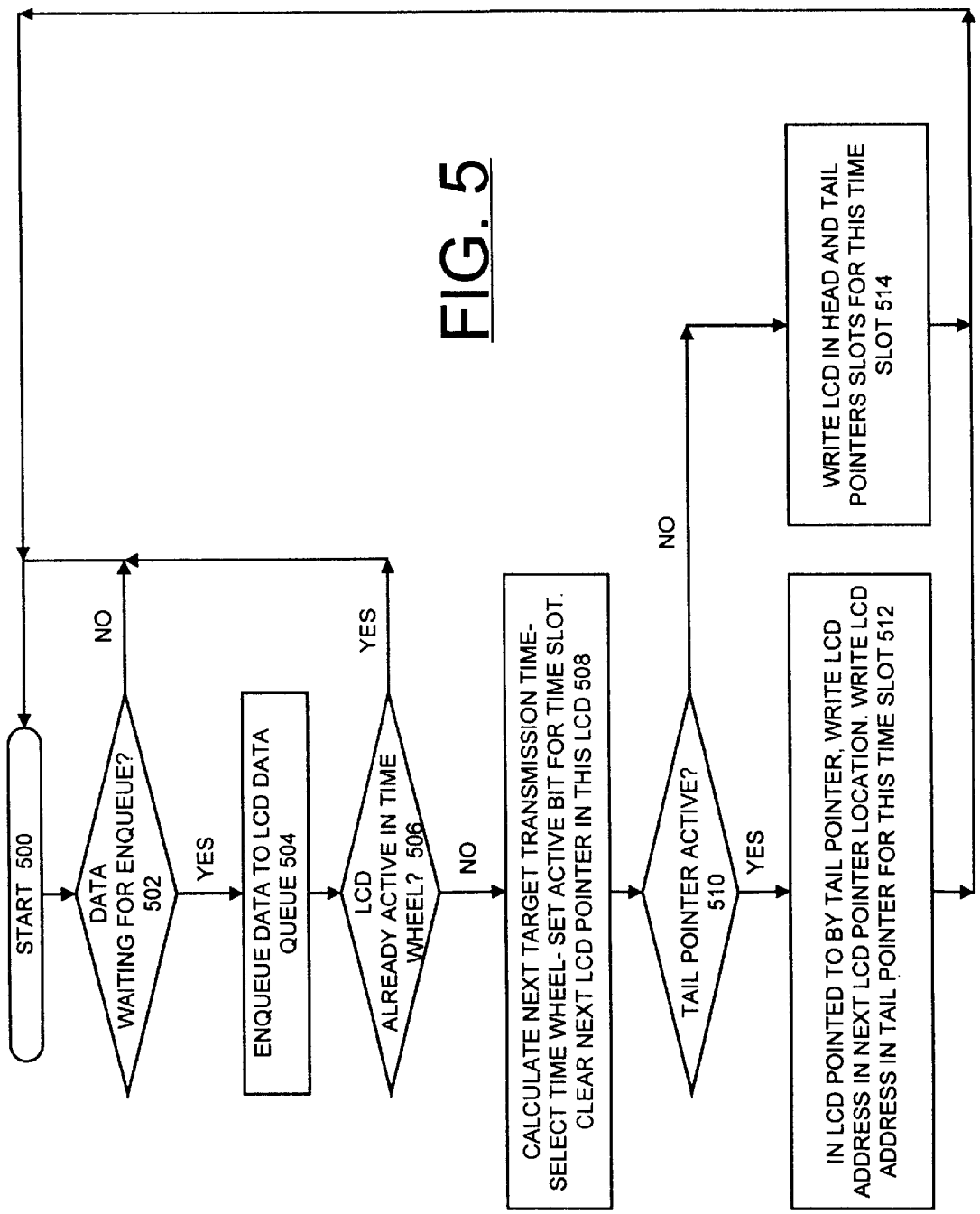
FIG. 5 is a flow chart illustrating sequential operations of the cell/frame scheduler of the preferred embodiment of FIG. 1 to enqueue cells.

Referring to FIG. 5, the general process used by the cell scheduler 102 to enqueue is illustrated including exemplary steps starting at a block 500. Checking for data waiting to be enqueued is performed as indicated at a decision block 502. If so, then the data waiting is enqueued to an LCD data queue as indicated at block 504. More than one LCD data queue can be provided for each logical connection. Next, checking for an LCD already active in the timing wheel 400 is provided as indicated at a decision block 506. If so, then the sequential operations return to the beginning at block 500. If the LCD is not already active in the timing wheel 400, then scheduling rate parameter frame/cell transmit 232 is identified as indicated at a block 508. Next as indicated at block 510 the next steps include to calculate a next target transmission time for the identified frame or cell, select a timing wheel 400 or 402, set an active bit for a time slot, and clear the next LCD pointer in this LCD. Next checking for an active tail pointer is provided , as indicated at a decision block 512. For an active tail pointer, in the LCD pointed to by the tail pointer, the LCD address is written in the next LCD pointer location and the LCD address is written in the tail pointer for this time slot as indicated at a block 514. Otherwise, the LCD is written in the head and tail pointer slots for this time slot as indicated at a block 516. Then the sequential operations return to the beginning at block 500.

Figure 6:
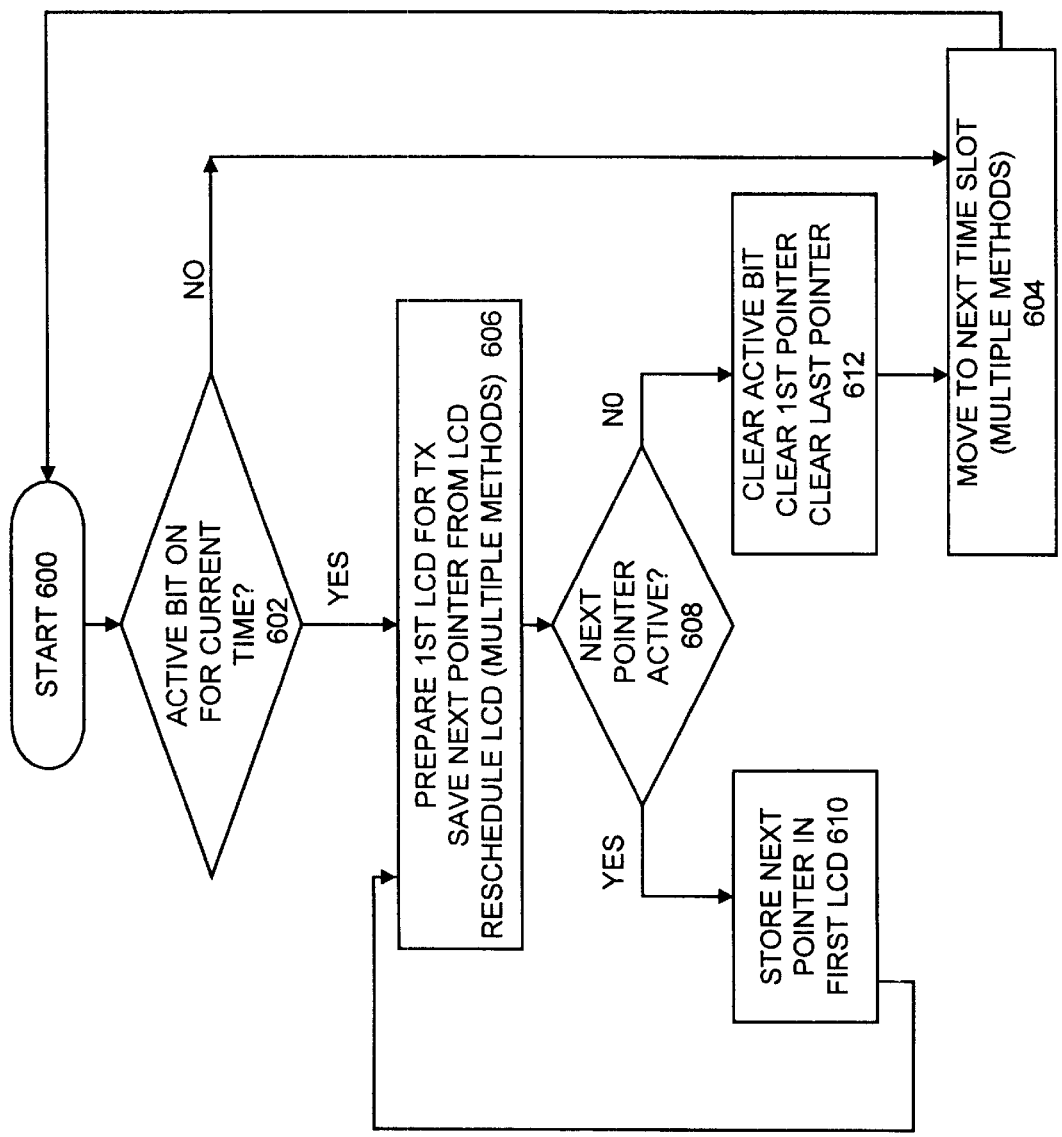
FIG. 6 is a flow chart illustrating sequential operations of the cell/frame scheduler of the preferred embodiment of FIG. 1 to determine a next logical channel descriptor (LCD) to pass to transmission preparation logic.

Referring to FIG. 6, the general process used by the cell/frame scheduler 102 to determine the next LCD to pass to the transmission preparation logic 208 is illustrated. As shown in FIG. 6, there are several possible mechanisms for calculating the next transmission time slot that an LCD should be moved to, and there are several mechanisms that may be used to calculate the move to the next time. Starting at a block 600, checking for an active bit ON for the current time is performed as indicated at a decision block 602. When an active bit ON for the current time is not identified, then a move to a next time slot is provided using one of multiple possible methods as indicated at a block 604. Then the sequential operation return to the beginning at block 600. Otherwise, when an active bit ON for the current time is identified, then the first LCD is prepared for transmission (TX), a next pointer from the LCD is saved and the LCD is rescheduled using one of multiple possible methods as indicated at a block 606. Checking for a next pointer being active is provided as indicated at a decision block 608. If yes, then the next pointer is stored in the first LCD as indicated at a block 610. Then the sequential operations return to block 606 to prepare the first LCD for transmission. Otherwise, when the next pointer is not active; then the active bit is cleared, the first pointer is cleared and the last pointer is cleared as indicated at a block 612. Then a move to a next time slot is performed at block 604. Then the sequential operation return to the beginning at block 600.

Figure 7:
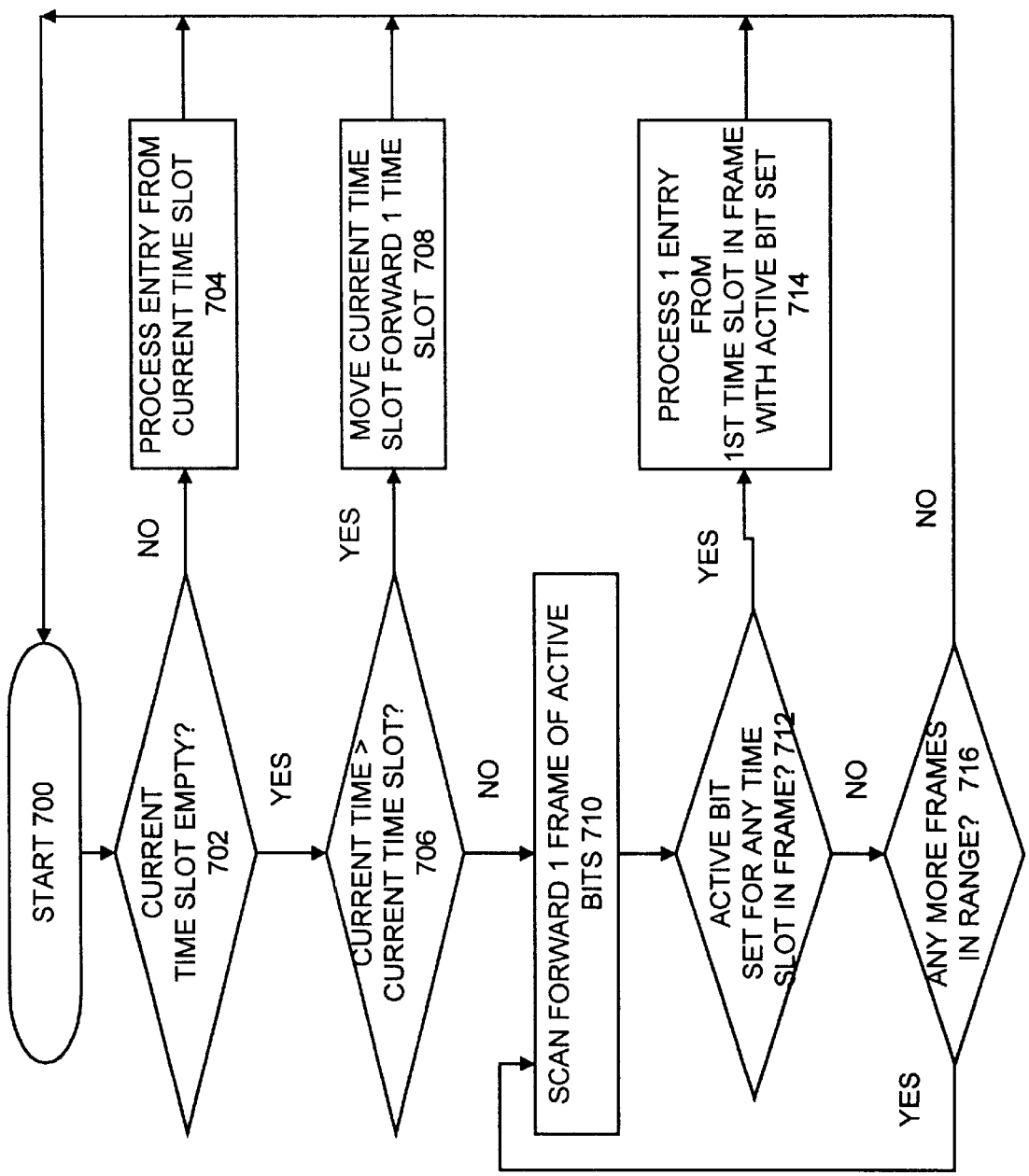
FIG. 7 is a flow chart illustrating sequential operations of the cell/frame scheduler of the preferred embodiment of FIG. 1 to determine a move to a next time slot.

Referring to FIG. 7, exemplary steps for the move to the next time are shown. The sequential steps begin at a block 700. Checking for an empty current time slot is performed as indicated at a decision block 702. If the current time slot is not empty, then the entry from the current time slot is processed as indicated at a block 704. Then the sequential operation return to the start at block 700. When the current time slot is empty, then the current time is compared with the current time slot as indicated at a decision block 706. If the current time is greater than the current time slot, then the current time slot is moved forward one time slot as indicated at a block 708. If the current time is less than or equal to the current time slot, then scanning forward one frame of active bits is performed as indicated at a block 710. Checking for an active bit on for any time slot in the frame is performed as indicated at a decision block 712. When an active bit on for any time slot in the frame is identified at block 712, then one entry form the first time slot in the frame with the active bit set is processed as indicated at a block 714 and the sequential operation return to the start at block 700. When an active bit on for any time slot in the frame is not identified at block 712, then checking for any more frames in the range L is performed as indicated at a decision block 716. When another frame in the range is identified, then the sequential operation return to block 710 for scanning forward one frame of active bits. When another frame in the range is not identified, then the sequential operation return to the start at block 700.

Figure 7A:
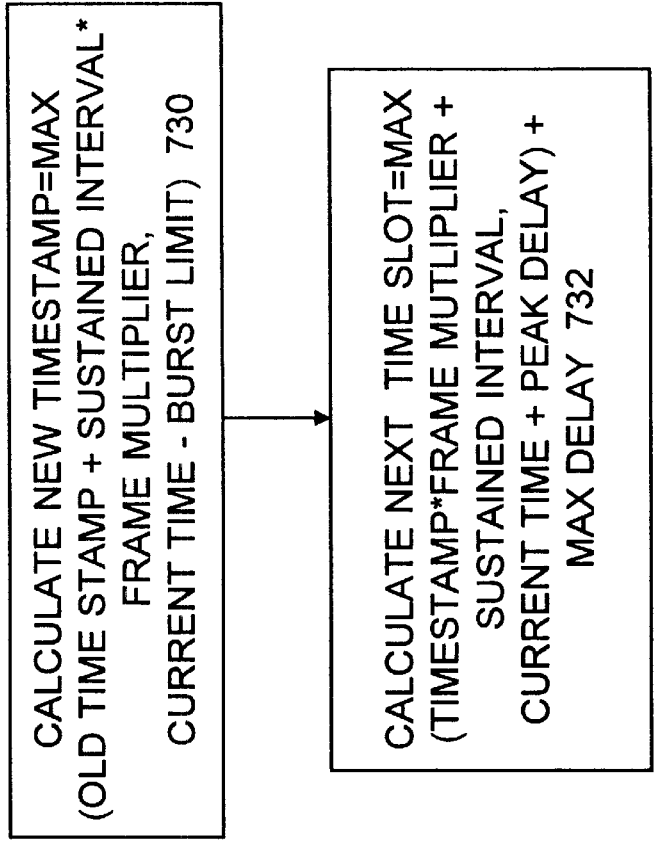
FIG. 7A is a flow chart illustrating calculation of a next time stamp and a next time slot by the cell/frame scheduler of the preferred embodiment of FIG. 1.

FIG. 7A illustrates calculation of a new time stamp and a new time slot by the cell/frame scheduler 102. A new time stamp is calculated as indicated at a block 730 utilizing the following equation:

New time stamp=MAX(old time stamp+sustained interval*frame multiplier, current time - burst limit).

A new time slot is calculated as indicated at a block 732 utilizing the following equation:

New time slot=MAX(time stamp+sustained interval*frame multiplier, current time+peak interval)+max delay, where peak interval is the minimum cell/frame interarrival time in slots. A frame multiplier of one is used when a cell is identified by the frame/cell transmit 232 of the scheduling rate parameters 220. Otherwise, a frame multiplier having a value greater than one is used when a frame is identified by the frame/cell transmit 232. The move forward method of FIG. 7 and the new time stamp and new time slot calculation algorithms of FIG. 7A provide the effect of maintaining a list of LCDs into the future that is sorted by deadline, resulting from the addition of the deadline term in the new time slot term. Cells or frames from the connection with the earliest deadline are transmitted first. When the transmission resource, network 100 is not over subscribed, each frame and each cell of multiple data streams will be transmitted before its deadline.

Figure 8:
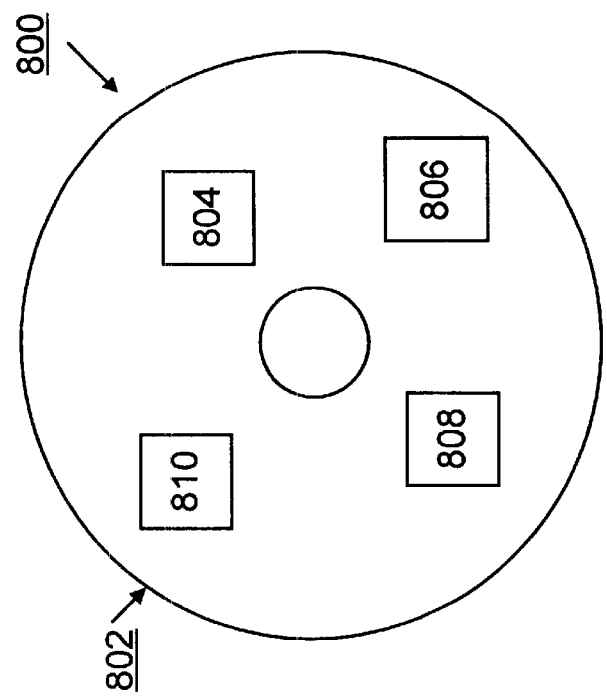
FIG. 8 is a block diagram illustrating a computer program product in accordance with the preferred embodiment.

Referring now to FIG. 8, an article of manufacture or a computer program product 800 of the invention is illustrated. The computer program product 800 includes a recording medium 802, such as, a floppy disk, a high capacity read only memory in the form of an optically read compact disk or CD-ROM, a tape, a semi-conductor read only memory (ROM), a transmission type media such as a digital or analog communications link, or a similar computer program product. Recording medium 802 stores program sequences 804, 806, 808, 810 on the medium 802 for carrying out the cell/frame scheduling methods of this invention in the communications system 100 of FIG.

A sequence of program instructions or a logical assembly of one or more interrelated modules defined by the recorded program sequences 804, 806, 808, 810, direct the cell/frame scheduler 102 for scheduling the transmission of cells and frames in communications network 100.

FIG. 9 is a block diagram representation illustrating a three tier timing wheel cell/frame scheduler 102. The three tier timing wheel cell/frame scheduler 102 includes a leaky bucket timing wheel 902 having a highest priority, an earliest deadline first timing wheel 904 having a middle priority and a best effort timing wheel 906 having a lowest priority. Three tier cell scheduler 102, a new time slot is calculated for the best effort timing wheel 906 that does not include the addition of the max delay 230, as shown in the following equation:

New time slot=MAX(time stamp+sustained interval*frame multiplier, current time+peak interval)

Figure 9A:
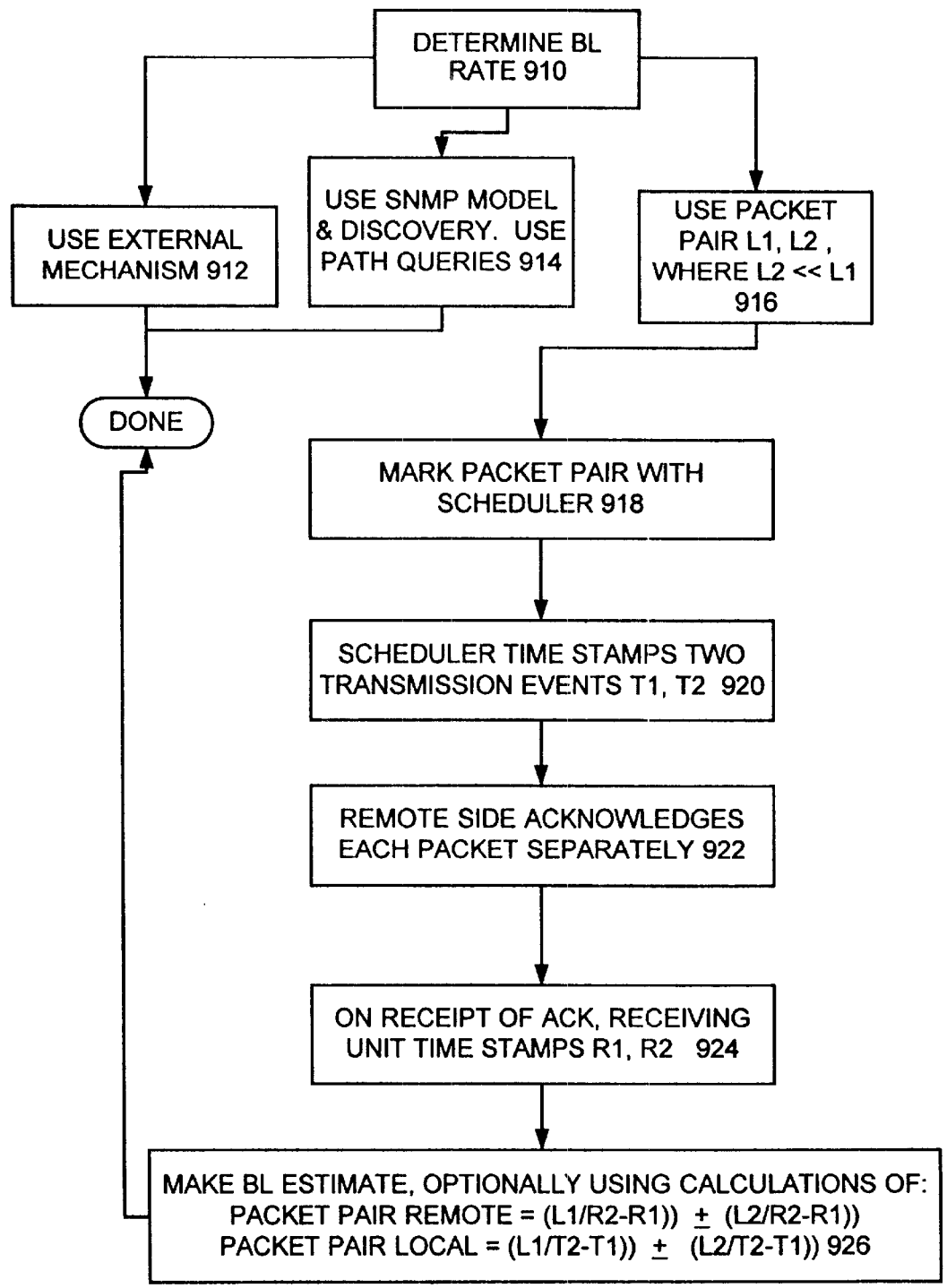
FIG. 9A is a flow diagram illustrating sequential bottleneck link discovery operations of the communications adapter of the preferred embodiment of FIG. 1.

FIG. 9A illustrates sequential bottleneck link (BL) discovery operations of a communications adapter used 10 with the cell/frame scheduler 102. A bottleneck link (BL) transmission rate is determined as indicated at a block 910. As indicated at a block 912, an external mechanism optionally is used to identify a BL rate, for example, such as disclosed by Van Jacobson, in the publication entitled "Congestion Avoidance and Control", Computer Communications Review, V 18, N 4, September, 1988, pps. 314-328. As indicated at a block 914, a SNMP model and discover optionally is used to identify a BL rate, using path queries as described in IBM product (identify). With the BL rate determined at either block 912 or block 914, this completes the operations. A packet pair including a long packet L1 followed by a short packet L2, where L2 <<L1 is used as indicated at a block 916. The packet pair is marked in the scheduler as 25 indicated at a block 916. The scheduler time stamps two transmission events as indicated at a block 918. The remote station acknowledges the packets L1, L2 separately as indicated at a block 920. On receipt of acknowledgment, receiving unit time stamps R1, R2 as 30 indicated at a block 922. A BL estimate is made as indicated at a block 924 optionally utilizing calculations defined by:

PACKET PAIR REMOTE=(L1/(R2-R1))÷(L2/(R2-R1))

PACKET PAIR LOCAL=(L1/(T2-T1))÷(L2/(T2-T1))

A much more complex calculation that can be used to determine the bottleneck link rate is disclosed in the above-identified publication entitled: "A Control Theoretic Approach to Flow Control" by Srinivasan Keshav.

Figure 10:
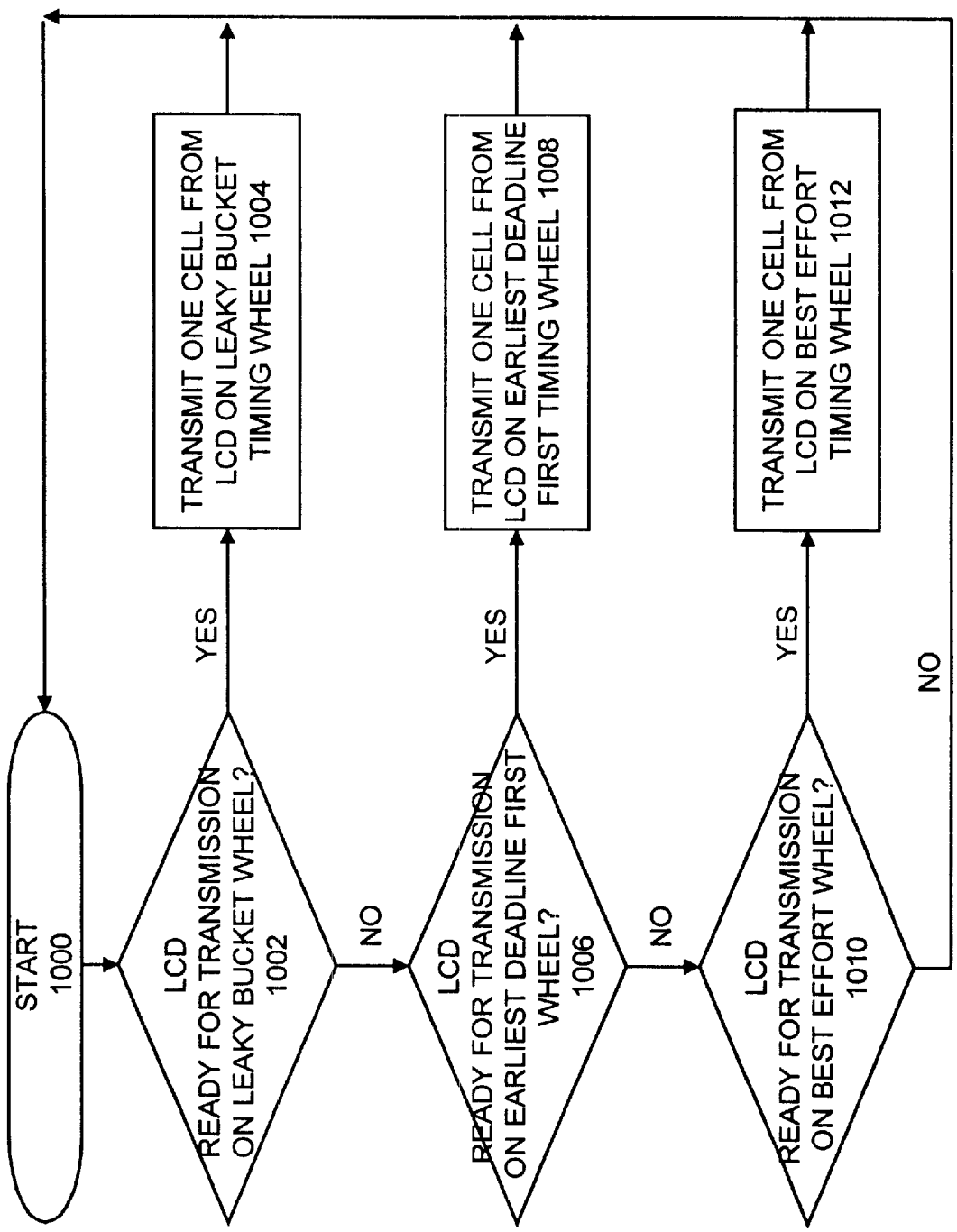
FIG. 10 is a flow chart illustrating exemplary operations of the three tier timing wheel cell/frame scheduler of FIG. 9.

FIG. 10 illustrates exemplary operations of the three tier timing wheel cell/frame scheduler 102 starting at a block 1000. First checking whether a LCD is ready for transmission on the highest priority leaky bucket wheel is performed as indicated at a decision block 1002. If a LCD is ready for transmission on the highest priority leaky bucket wheel 902, then one cell or one frame is transmitted from the LCD on the leaky bucket timing wheel as indicated at a block 1004. Then the sequential operations return to the beginning at block 1000.

When a LCD is not ready for transmission on the highest priority leaky bucket wheel 902, then checking whether a LCD is ready for transmission on the middle priority earliest deadline first wheel 904 is performed as indicated at a decision block 1006. If a LCD is ready for transmission on the middle priority earliest deadline first timing wheel 904, then one cell or one frame is transmitted from the LCD on the earliest deadline first timing wheel 904 as indicated at a block 1008. Then the sequential operations return to the beginning at block 1000.

When a LCD is not ready for transmission on the middle priority earliest deadline first timing wheel 904, then checking whether a LCD is ready for transmission on the lowest priority best effort timing wheel 906 is performed as indicated at a decision block 1010. If a LCD is ready for transmission on the lowest priority best effort timing wheel 906, then one cell or one frame is transmitted from the LCD on the lowest priority best effort timing wheel 906 as indicated at a block 1012. When a LCD is not ready for transmission on the lowest priority best effort timing wheel 906 or after the cell or frame is transmitted at block 1012, then the sequential operations return to the beginning at block 1000.

Figure 11:
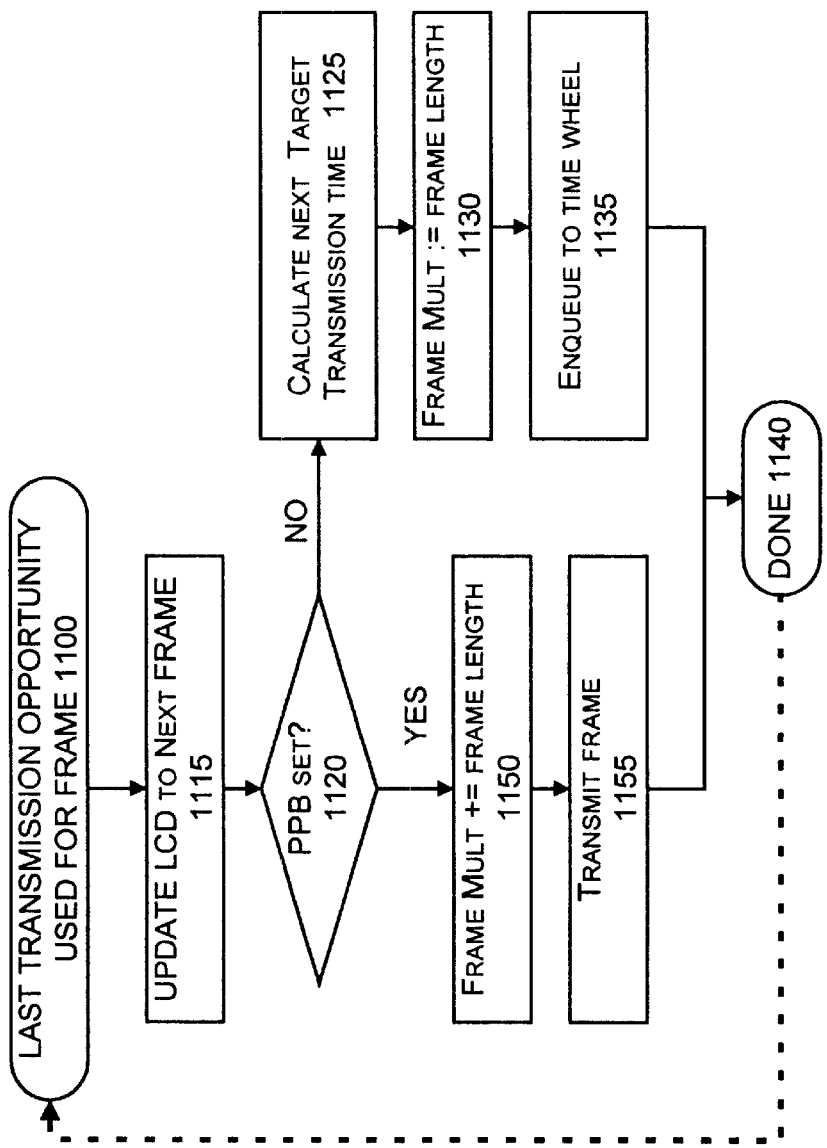
FIG. 11 is a flow chart illustrating exemplary operations in the transmission of a packet pair.

Referring now to FIG. 11, exemplary scheduler operations in the transmission of a packet pair are shown. The frame multiplier is used to move forward on the time wheel and to calculate the next target transmission time. A last transmission opportunity used for frame is identified as indicated at a block 1100. In a cell based environment, the last cell of a frame that is transmitted is identified at block 1100. In a frame based environment, when a frame is transmitted is identified at block 1100. The LCD is updated for the current frame to the next frame as indicated at a block 1115. The frame header is checked for a packet pair bit (PPB) being set as indicated at a decision block 1120. If the PPB is not set, then the next target transmission time is calculated as indicated at a block 1125. Then the frame multiplier is replaced as indicated at a block 1130 and is enqueued to the time wheel as indicated at a block 1135. This completes the sequential operations as indicated at a block 1140.

Otherwise when the PPB is set, then the frame multiple is accumulated as indicated at a block 1150 and the frame is transmitted as indicated at a block 1155. When constructing a scheduler to produce packet pairs, as shown in FIG. 11, the frame length to produce the frame multiplier is accumulated as shown in step 1150 rather than being replaced, as shown in step 1130. This completes the sequential operations at block 1140 and the sequential steps continue, returning to block 1100 after the frame is transmitted at block 1155.

While the packet pair scheduling capability is illustrated in the context of a frame/cell agile scheduler, the packet pair technique can be advantageously used in an all cell or all frame environment and represents an advance in the art of schedulers.

Figure 12:
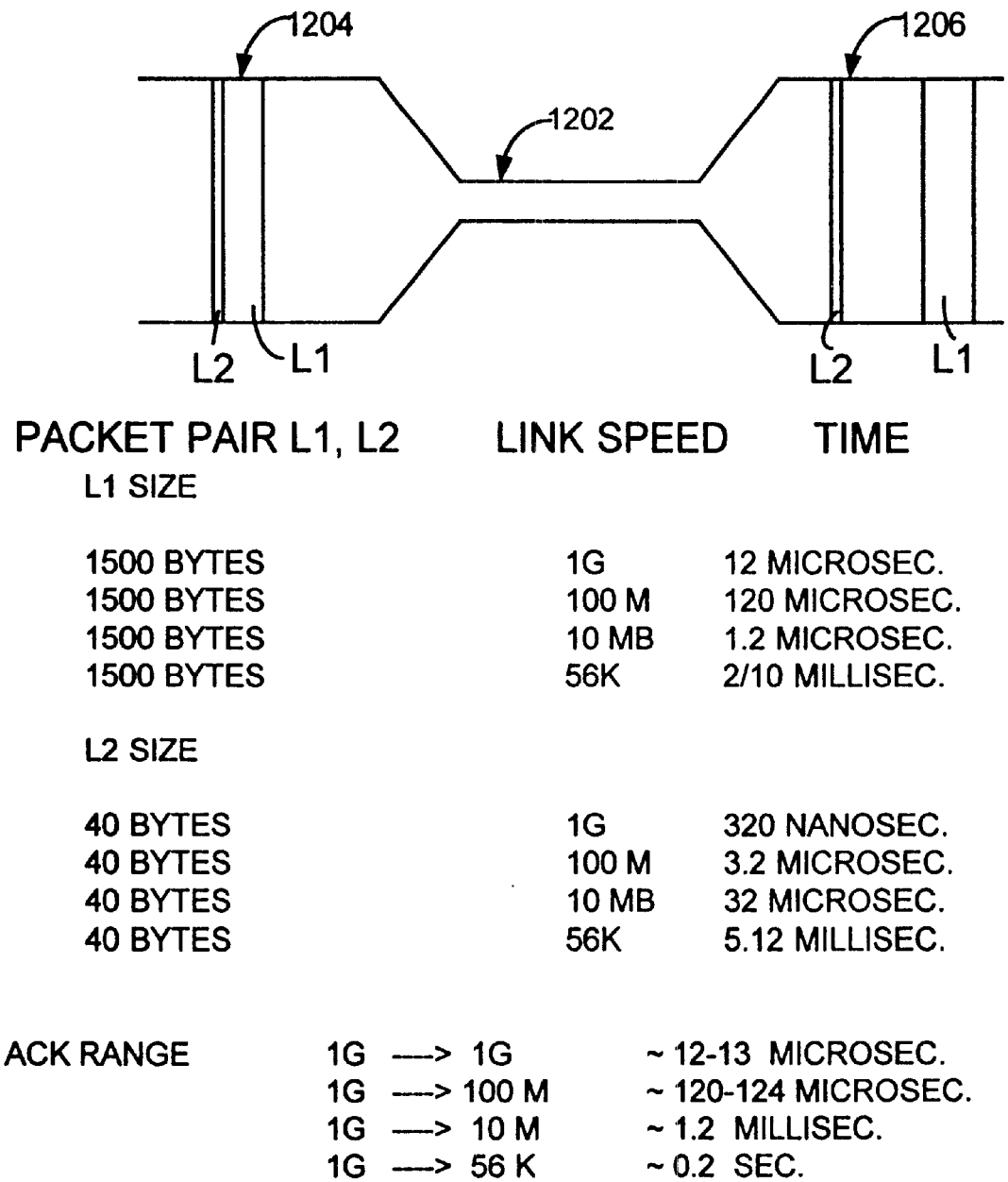
FIG. 12 is a diagram illustrating a communications bottleneck together with a chart of packet pair size, link speed and time values.

FIG. 12 is a diagram illustrating a communications bottleneck link 1202 between two high bandwidth links 1204 and 1206 in a communication network, such as network 20 100. FIG. 12 provides a chart of packet pair L1, L2 including exemplary packet sizes, link speeds and time values together with acknowledgment time ranges for exemplary combinations of link speeds. Additional information is provided in the above incorporated application, entitled: COMMUNICATIONS METHODS AND GIGABIT ETHERNET COMMUNICATIONS ADAPTER PROVIDING QUALITY OF SERVICE AND RECEIVER CONNECTION SPEED DIFFERENTIATION, by Branstad et al.

The communications scheduler of the present invention is preferably implemented using an appropriate scheduling program recorded on a machine-readable medium and executing on a programmable processor, but could alternatively be implemented entirely as hardware registers and logic, or as some combination of hardware and a programmable processor.

While the present invention has been described with reference to the details of the embodiments of the invention shown in the drawing, these details are not intended to limit the scope of the invention as claimed

What is claimed is:

1. An computer program product for scheduling communications over a communications network including both cells and frames, said program product comprising a plurality of processor-executable instructions recorded on a computer-readable medium, wherein said instructions, when executed by a computer processor, perform the steps of:
scheduling the transmission of cells and frames utilizing a selected scheduling algorithm including the steps of:
identifying a frame or cell transmission type;
responsive to said identified frame or cell transmission type, identifying a frame multiplier value;
calculating a target transmission time for said frame or cell transmission type utilizing said identified frame multiplier value.

2. The computer program product for scheduling communications over a communications network including both cells and frames as recited in claim 1 further includes means for enqueuing data of each of the communications to a corresponding frame or cell queue.

3. The computer program product for scheduling communications over a communications network including both cells and frames as recited in claim 1 wherein said selected scheduling algorithm includes the scheduling of earliest deadline communications first.

4. The computer program product for scheduling communications over a communications network including both cells and frames as recited in claim 1 wherein said selected scheduling algorithm includes the scheduling of communications for providing proportional use of network bandwidth.

5. The computer program product for scheduling communications over a communications network including both cells and frames as recited in claim 1 wherein said frame multiplier value equals one responsive to an identified cell transmission type.

6. The computer program product for scheduling communications over a communications network including both cells and frames as recited in claim 1 wherein said frame multiplier value is a value greater than or equal to one responsive to an identified frame transmission type.

7. A method for scheduling communications over a communications network including both cells and frames comprising the steps of:
scheduling the transmission of cells and frames utilizing a selected scheduling algorithm including the steps of:
identifying a frame or cell transmission type;
responsive to said identified frame or cell transmission type, identifying a frame multiplier value;
calculating a target transmission time for said frame or cell transmission type utilizing said identified frame multiplier value.

8. The method for scheduling communications over a communications network including both cells and frames as recited in claim 7 includes the steps of enqueuing data of each of the communications to a corresponding frame or cell queue.

9. The method for scheduling communications over a communications network including both cells and frames as recited in claim 7 wherein the step of scheduling the transmission of cells and frames utilizing said selected scheduling algorithm includes the step of utilizing said selected scheduling algorithm for scheduling of earliest deadline communications first.

10. The method for scheduling communications over a communications network including both cells and frames as recited in claim 7 wherein the step of scheduling the transmission of cells and frames utilizing said selected scheduling algorithm includes the step of utilizing said selected scheduling algorithm for providing proportional use of network bandwidth.

11. The method for scheduling communications over a communications network including both cells and frames as recited in claim 7 wherein said frame multiplier value of one is used for calculating said target transmission time, responsive to an identified cell transmission type.

12. The method for scheduling communications over a communications network including both cells and frames as recited in claim 7 wherein said frame multiplier value of greater than one is used for calculating said target transmission time, responsive to an identified frame transmission type.

13. An apparatus for scheduling communications over a communications network comprising:

means for identifying a last transmission opportunity used for a frame;

means, responsive to said identified last transmission opportunity used for said frame, for updating a logical channel descriptor (LCD) to a next frame;

means for checking a frame header for a packet pair bit being set; and means, responsive to an identified packet pair bit not being set, for calculating a target transmission time for said frame utilizing a frame multiplier value.

14. The apparatus for scheduling communications over a communications network as recited in claim 13 further includes means, responsive to an identified packet pair bit not being set, for replacing a frame multiplier.

15. The apparatus for scheduling communications over a communications network as recited in claim 13 further includes means, responsive to an identified packet pair bit being set, for accumulating a frame multiplier.

16. The apparatus for scheduling communications over a communications network as recited in claim 15 further includes means, responsive to accumulating said frame multiplier, for transmitting said frame.

17. The apparatus for scheduling communications over a communications network as recited in claim 13 further includes means, responsive to an identified packet pair bit being set, for transmitting said frame.

* * * * *